(12) United States Patent
Downey et al.

(10) Patent No.: US 9,393,867 B2
(45) Date of Patent: Jul. 19, 2016

(54) HAND CONTROL THROTTLE SYSTEM

(71) Applicants: Brian A. Downey, Bluemont, VA (US); Ryan A. Downey, Paris, VA (US); Philip W. Worthington, Jamesport, NY (US)

(72) Inventors: Brian A. Downey, Bluemont, VA (US); Ryan A. Downey, Paris, VA (US); Philip W. Worthington, Jamesport, NY (US)

(*) Notice: Subject to any disclaimer, the term of this patent is extended or adjusted under 35 U.S.C. 154(b) by 0 days.

(21) Appl. No.: 14/215,000

(22) Filed: Mar. 16, 2014

(65) Prior Publication Data
US 2015/0258890 A1    Sep. 17, 2015

Related U.S. Application Data

(60) Provisional application No. 61/801,841, filed on Mar. 15, 2013.

(51) Int. Cl.
| | | |
|---|---|---|
| B62D 1/04 | (2006.01) | |
| B60K 20/06 | (2006.01) | |
| B60K 26/00 | (2006.01) | |
| B60K 26/02 | (2006.01) | |
| G05G 1/01 | (2008.04) | |

(52) U.S. Cl.
CPC ............. *B60K 26/02* (2013.01); *G05G 1/01* (2013.01); *B60K 2026/028* (2013.01); *Y10T 74/20516* (2015.01)

(58) Field of Classification Search
CPC ............ B62D 1/04; B62D 1/043; B62D 3/02; Y10T 74/20146; B60K 26/02; B60K 2026/028; G05G 1/01
USPC .......... 74/473.31, 480 R, 492, 496, 498, 552, 74/555; 180/78; 463/37, 38
See application file for complete search history.

(56) References Cited

U.S. PATENT DOCUMENTS

| | | | | |
|---|---|---|---|---|
| 7,775,884 | B1 * | 8/2010 | McCauley | ...................... 463/39 |
| 8,366,547 | B2 * | 2/2013 | Haswell et al. | ................. 463/37 |
| 8,915,342 | B2 * | 12/2014 | Cook | ........................... 192/3.55 |
| 9,002,597 | B2 * | 4/2015 | Sata | ............................... 701/52 |

FOREIGN PATENT DOCUMENTS

| | | | | | |
|---|---|---|---|---|---|
| IT | WO 2010046941 | A1 * | 4/2010 | ............. | B60K 26/02 |
| IT | WO 2010109510 | A1 * | 9/2010 | ............. | B60K 26/02 |

* cited by examiner

*Primary Examiner* — Adam D Rogers
(74) *Attorney, Agent, or Firm* — Blank Rome LLP

(57) ABSTRACT

A hand control throttle system includes an actuating mechanism and a sensor. The system is mounted to a standard steering wheel for a vehicle, so that a disabled driver can operate the throttle using a single hand (either right or left) while the hand is also holding the steering wheel.

9 Claims, 5 Drawing Sheets

HAND CONTROL THROTTLE SYSTEM

RELATED APPLICATION

This application claims the benefit of U.S. Provisional Application No. 61/801,841, filed Mar. 15, 2013, the entire contents of which are incorporated herein by reference.

BACKGROUND OF THE INVENTION

Motorized vehicles are controlled by the use of a throttle, brake, and steering assembly. The throttle controls acceleration, and for gas engine vehicles generally control the flow of fluid entering the engine. The brakes slow down the vehicle, and the steering assembly controls the direction of the vehicle. Traditionally, the steering assembly includes a steering wheel that is located in front of the driver, so that the driver can turn the wheel with his or her hands. The throttle pedal and brake pedal are located at the floor of the vehicle, so that the user or driver can actuate them by pressing and releasing with the right foot. A throttle cable and brake cable are respectively attached to the throttle and brake pedals, to transmit the action taken by the driver. In current vehicles, the throttle is connected to an electrical wire that carries an electrical signal to an Electrical Control Module (ECM) for the vehicle. The ECM receives the control signal on the wire and controls acceleration based on the received control signal.

However, operation of these components can be difficult or impossible for disabled persons having disabilities that affect the hands and/or feet. Such disabilities can result from debilitating diseases like arthritis, and persons with missing limbs. Accordingly, a vehicle control assembly is needed that is reliable and easy to use by disabled persons, and especially persons with disabilities that affect the feet.

DETAILED DESCRIPTION OF THE PREFERRED EMBODIMENTS

Figure 1:
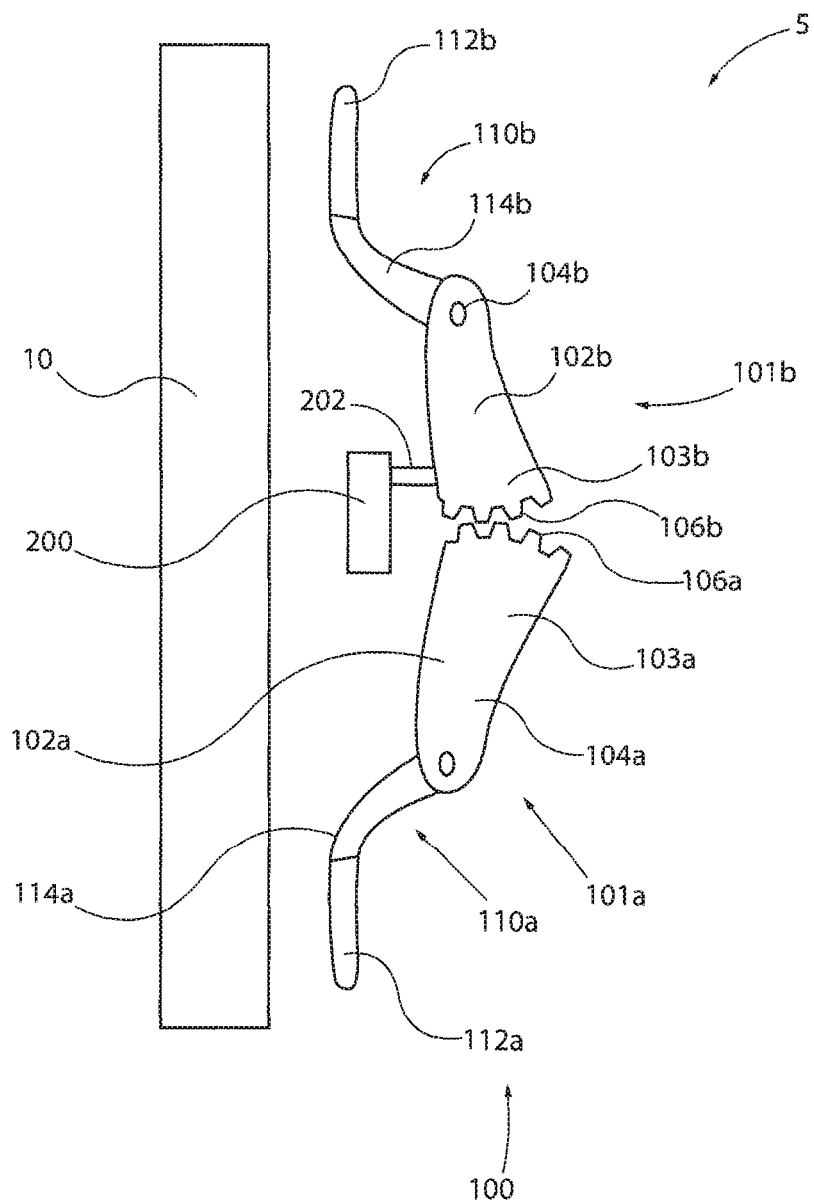
FIG. 1 is a top view of the throttle system in accordance with an embodiment of the invention positioned on a steering wheel.

In describing the preferred embodiments of the present invention illustrated in the drawings, specific terminology is resorted to for the sake of clarity. However, the present invention is not intended to be limited to the specific terms so selected, and it is to be understood that each specific term includes all technical equivalents that operate in a similar manner to accomplish a similar purpose.

Figure 2:
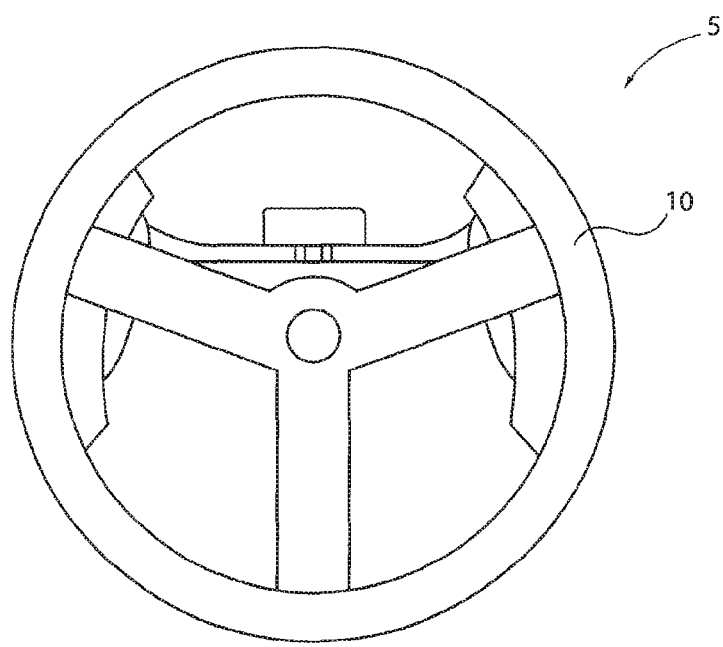
FIG. 2 is a front view of the throttle system of FIG. 1.
Figure 3:
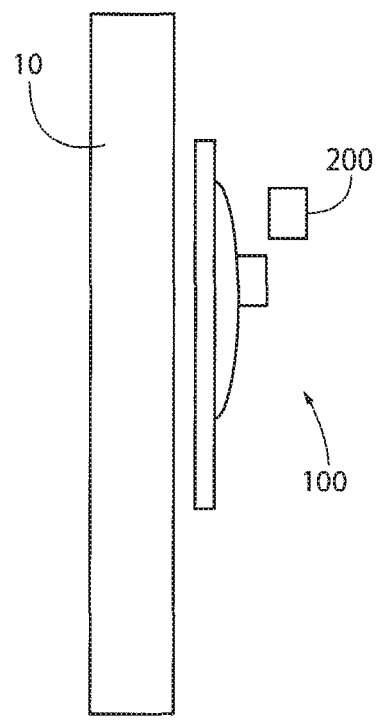
FIG. 3 is a side view of the throttle system of FIG. 1.
Figure 4:
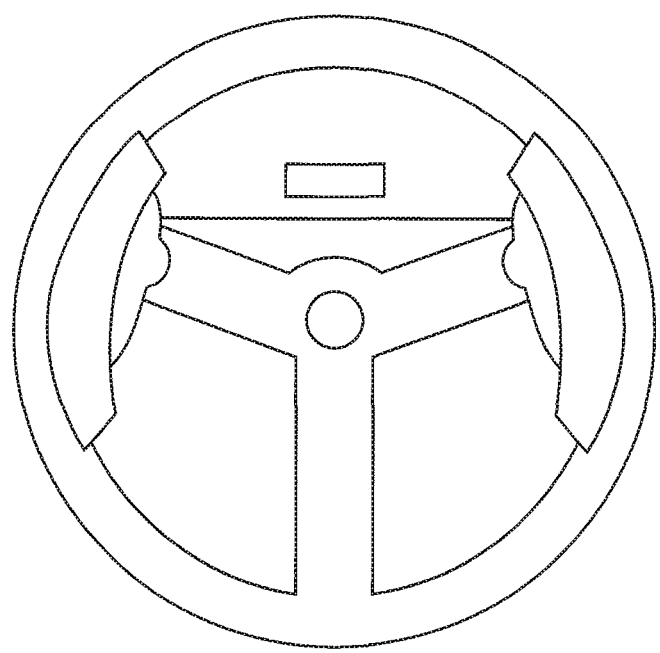
FIG. 4 is a rear view of the throttle system of FIG. 1.

Turning to the drawings, FIG. 1 shows a hand control throttle system 5 in accordance with an embodiment of the present invention. The system 5 includes an actuating mechanism 100 and a sensor 200. The system 5 is mounted to a standard steering wheel 10 for a vehicle, so that a disabled driver can operate the throttle using a single hand (either right or left) while that same hand is also holding the steering wheel. The steering wheel 10 is best shown in FIGS. 2-4.

Figure 5:
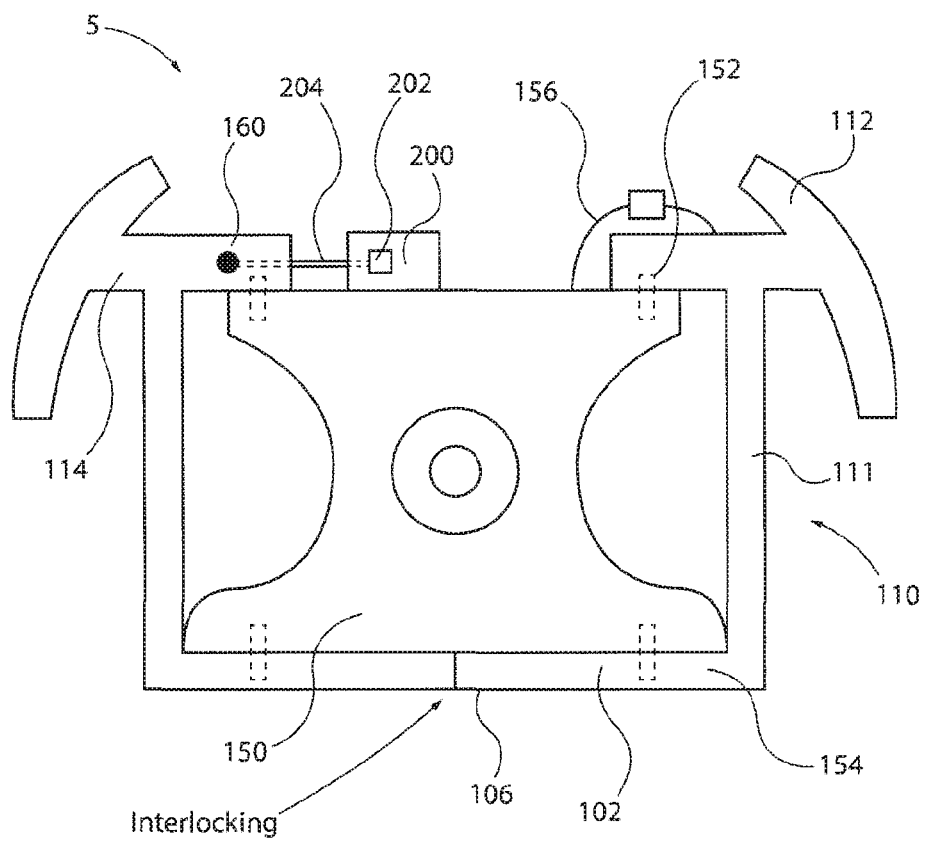
FIG. 5 is a view of the mounting frame for the throttle system of FIG. 1.

Returning to FIG. 1, the actuating mechanism 100 is shown juxtaposed behind the steering wheel 10. The actuating mechanism 100 includes two arm-like paddles or levers 101*a*, 101*b* and a mounting frame 150 (FIG. 5). Each lever 101*a*, 101*b* has a respective main body 102*a*, 102*b* and an arm 110*a*, 110*b*. The lever body 102*a*, 102*b* is flat and elongated, with a proximal end 103*a*, 103*b* and a distal end 104*a*, 104*b*. The body 102*a*, 102*b* is wider at the proximal end 103*a*, 103*b* and narrower at the distal end 104*a*, 104*b*. The proximal end 103*a*, 103*b* has a leading edge with gear teeth 106*a*, 106*b* that face inward toward each other. Thus, the gear teeth 106*a* of the first lever 101*a* align with and cooperatively engage the gear teeth 106*b* of the second lever 101*b*.

Figure 6:
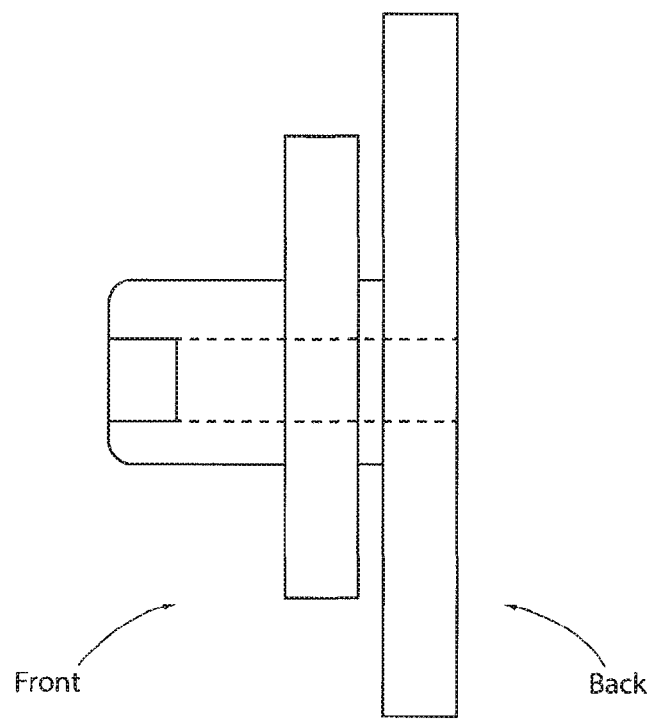
FIG. 6 is a side view of the system mounted to a steering column.

The mounting frame 150 (FIG. 5) is substantially flat and rectangular in shape. It has a central circular opening that fits about the steering column of the vehicle. As best shown in FIG. 6, the mounting frame 150 is mounted to the steering column of the vehicle so that the frame 150 rotates as the steering wheel 100 and steering column rotate. The mounting frame 150 can be mounted in any suitable manner to the steering column. For instance, a circular sleeve with a central round opening can be fitted to be wedged between the steering wheel 100 and the steering column. Accordingly, to install the device 5, the steering wheel 10 is removed, the device 5 is fit over the end of the steering column. The wheel 10 is then replaced over the device 5 and the device 5 and wheel 10 are bolted to the steering column.

The arm 110 is connected to the distal end 104 of the main body 102, and includes a support arm 111 that leads upward to a transverse cross-support member 114. The cross-support member 114 has a distal end and a proximal end opposite the distal end. The distal end of the cross-support member 114 has an opening that receives a pivot pin (such as a screw). A handle 112 is formed at the proximal end of the cross-support member 114. In addition, the distal end of the main body 102 has an opening that also receives a pivot pin (such as a screw). The opening in the cross-support member 114 and the opening in the body 102 are substantially aligned with one another so that the arm 110 can pivot with respect to the mounting frame 150. The arm 110 connects the main body 102 at the base of the device to the cross-support member 114 at the top of the device.

Referring to both FIGS. 1 and 5, the handle 112 is positioned to be just inside (or outside) the steering wheel 10 so that it can easily be reached by a driver while his/her hands are still grasping the steering wheel 10. The handles 112*a*, 112*b* extend parallel to and spaced apart from the rotational axis of the steering wheel 10. The handle 112 is sufficiently close to the steering wheel 10 so that the driver can reach it, but sufficiently spaced from the steering wheel 10 so that it does not interfere with the steering wheel 10, does not obstruct the driver, and allows for the handle 112 to be pulled inward to accelerate the vehicle.

The pivot pins 152, 154 pivotally mount the arm 110 to the frame 150. Accordingly, the lever body 102 is pivotally connected with respect to the wheel 10, so that the gear teeth 106 rotate transversely (to the left and right in the embodiment of FIG. 1; and in/out in the embodiment of FIG. 5) with respect to the sensor 200 and the rotational axis of the steering wheel 10. When the driver pulls the handle 112 inward toward the steering wheel 10, the actuating mechanism 101 pivots about the pivot pins 152, 154, and the main body 102 pivots such that the proximal ends 103*a*, 103*b* move outward. The vertical arms 111 position the handles 112 toward the top half of the steering wheel 10 while the main body 102 is at the bottom half of the steering wheel 10 so that the wheel 10 does not interfere with operation of the device 5. A tensioning spring 156 is positioned about the pivot pin 152 and connects to the frame 150 to bias the levers 101 so that the handles 112 are biased outward at their outermost position. The user pulls the handles 112 inward against the force of the spring 156.

The sensor 200 is fastened to the frame 150, such as by a screw or bolt or by adhesive or a removable clamp. The sensor 200 has an elongated rectangular shape, but any suitable shape can be used. The sensor 200 is connected to an electrical wire that would normally be connected to the throttle pedal located at the floor of the vehicle. Instead, the wire is routed to be connected with the sensor 200. The wire carries a control signal from the sensor 200 to the ECM to control acceleration of the vehicle.

In one embodiment, the sensor 200 is a potentiometer that has a sensor pin 202 that extends outward and backward (to the right in FIG. 1) from the sensor. The pin 202 travels along the length of the potentiometer (to the left/right in FIG. 5 and up/down in FIG. 1). The sensor 200 can be mounted to the top of the frame 150. As best shown in FIG. 5, a small elongated projection 160 extends outward and backward from the face of the rear face of the frame 150. The projection 160 has an opening that receives a connecting device, here shown as a metal connect rod 204. One end of the rod 204 is fixed in the projection 160 opening, and the other end of the rod 204 is engaged to the pin 202 of the sensor 200. As the handles 112 are moved inward toward the steering wheel 10, the projection 160 is pulled transversely outward (to the left in FIG. 4 or down in FIG. 1). The projection 160 in turn pulls the pin 202 of the sensor 200, which controls acceleration of the vehicle.

A stop that projects from the main body 102 can be positioned to stop rotational movement of the actuating mechanisms 101 at maximum and minimum positions.

In addition, because the levers 101a, 101b are engaged to one another by the gear teeth 106, both levers 101a, 101b move when either of the levers 101a, 101b is moved. Thus, as the driver pulls inward on one of the handles 112a, both of the levers 101a, 101b will move and operate against the sensor pin. Thus, the driver only needs to be able to operate one of the handles 112a, 112b in order to operate the vehicle. The user can hold the steering wheel 10 and at the same time reach one or more fingers to grab the handle 112 and pull the handle 112 inward toward the steering wheel 10. The handles 112a, 112b are located to approximately be located at the optimal driving positions of 10 o'clock and 2 o'clock, but can be located at any suitable positions with respect to the wheel 10. It is noted that two actuating mechanisms 100a, 100b are provided. However, only a single actuating mechanism 100a, 100b need be provided.

The levers 101a, 101b extend substantially the entire width (diameter) of the wheel 10, so that the handles 112a, 112b are accessible from both sides of the steering wheel 10. The levers 101 rotate as the wheel 10 rotates, or can be configured to remain stationary as the wheel 10 rotates.

It should further be apparent that although the throttle system 5 has been described for use with a gas powered car, it can be utilized with any vehicle, such as gas, diesel, natural gas, hybrid, or electric car. In addition, the throttle system 5 can be used with any vehicle having a steering mechanism, such as a boat, golf cart, go-cart, truck, heavy equipment or machinery, forklifts, payloader, or the like. It can also be used in a driving simulator or video game. In addition, the system 5 can be integrated into a vehicle or sold as a separate kit that is installed into a vehicle.

Though the sensor has been described to be a potentiometer, other suitable sensor can be utilized, especially a sensor that controls a vehicles speed and/or acceleration. For instance, a Hall Effect, or encoder can be used.

The description and drawings of the present invention provided in the paper should be considered as illustrative only of the principles of the invention. The invention may be configured in a variety of ways and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A vehicle throttle comprising:
a mounting frame configured to be mounted to a steering column;
a sensor having a pin;
an actuating mechanism having a body pivotally mounted to the mounting frame and having a toothed outer edge, said actuating mechanism having a handle extending outward from the body; and
an elongated connecting device having a first end coupled to the pin and a second end coupled to the actuating mechanism, wherein the handle can be pulled inward to pivot the body and actuate the pin via the connecting device.

2. The throttle of claim 1, wherein said pin travels along a length of the sensor and the connecting device moves the pin along the length of the sensor in response to actuation of the handle.

3. The throttle of claim 1, wherein said sensor is a potentiometer and the pin is adjustable.

4. A hand control throttle for a vehicle comprising:
a vehicle mounting frame configured to be mounted to a vehicle steering wheel column;
a variable sensor to variably control acceleration of the vehicle;
a variable actuating mechanism coupled to the mounting frame and having a handle directly coupled with the variable sensor by an elongated rod, the handle configured to be actuated by a user's hand while gripping a steering wheel, wherein the handle can be moved inward and outward with respect to the steering wheel to variably control the variable sensor to variably control acceleration of the vehicle.

5. The throttle of claim 2, wherein the variable sensor has an output that varies in responsive to movement of the handle to variably control acceleration of the vehicle.

6. The throttle of claim 5, wherein said variable sensor is a potentiometer.

7. A vehicle throttle comprising:
a mounting frame having a central opening configured to be mounted to a steering column, said mounting frame having a generally square shape with a top portion and a bottom portion;
a sensor having a pin, said sensor mounted to the top portion of said mounting frame;
an actuating mechanism having a first lever and a second lever, said first and second levers each having a handle portion pivotally mounted to and extending outward from the top portion of said mounting frame, said first and second levers each further having a body portion with an inwardly-facing toothed edge, the body portion pivotally mounted to the bottom portion of said mounting frame, wherein the toothed edge of said first lever interlocks with the toothed edge of said second lever; and an elongated connecting rod having a first end coupled to the pin and a second end coupled to the handle portion of the first lever or the second lever, wherein the handle portion of the first lever and/or the second lever can be pulled inward to actuate the pin via the connecting rod and to pivot the body portion and the interlocked toothed edge.

8. The throttle of claim 7, said first and second levers each further comprising a support arm having a first end coupled with the body portion at the bottom portion of the mounting frame and a second end coupled with the handle portion at the top portion of the mounting frame.

9. The throttle of claim 7, wherein said pin travels along a length of the sensor and the connecting rod moves the pin along the length of the sensor in response to actuation of the handle portion.

* * * * *